(12) United States Patent
Kamil et al.

(10) Patent No.: US 9,981,523 B2
(45) Date of Patent: May 29, 2018

(54) VEHICLE SHOCK ABSORBER SYSTEM AND ACCESSORY THEREOF

(71) Applicant: REGO VEHICLES LTD., MP Upper Galil (IL)

(72) Inventors: Ami Kamil, Be'erotayim (IL); Izik Mini, Rosh Pina (IL)

(73) Assignee: REGO VEHICLES LTD., MP Upper Galil (IL)

( * ) Notice: Subject to any disclaimer, the term of this patent is extended or adjusted under 35 U.S.C. 154(b) by 0 days. days.

(21) Appl. No.: 15/107,293

(22) PCT Filed: Dec. 22, 2014

(86) PCT No.: PCT/IL2014/051117
§ 371 (c)(1),
(2) Date: Jun. 22, 2016

(87) PCT Pub. No.: WO2015/097696
PCT Pub. Date: Jul. 2, 2015

(65) Prior Publication Data
US 2017/0008364 A1    Jan. 12, 2017

Related U.S. Application Data

(60) Provisional application No. 61/919,829, filed on Dec. 23, 2013.

(51) Int. Cl.
*B60G 17/08* (2006.01)
*F16F 9/19* (2006.01)
(Continued)

(52) U.S. Cl.
CPC ............ *B60G 17/08* (2013.01); *B60G 13/08* (2013.01); *F16F 9/19* (2013.01); *F16F 9/44* (2013.01);
(Continued)

(58) Field of Classification Search
CPC ............ B60G 2202/21; B60G 2202/24; B60G 17/08; B60G 13/08; B60G 13/06; F16F 9/19; F16F 9/44; F16F 9/50
(Continued)

(56) References Cited

U.S. PATENT DOCUMENTS 3,008,728 A    11/1967   Fiala
5,447,332 A     9/1995   Heyring
(Continued)

FOREIGN PATENT DOCUMENTS

DE         3533540      4/1986
GB          284062      1/1928

OTHER PUBLICATIONS

International Search Report completed Apr. 13, 2015 for PCT/IL2014/051117.
(Continued)

*Primary Examiner* — Melanie Torres Williams
(74) *Attorney, Agent, or Firm* — Paul D. Bianco; Katharine Davis; Fleit Gibbons Gutman Bongini & Bianco PL

(57) ABSTRACT

A vehicle shock absorber system configured with more than one pressure cylinder that provides advantageous damping characteristics for different loads. There is provided a vehicle shock absorber system having a primary pressure cylinder including upper and lower primary chambers separated by a primary piston head, an auxiliary pressure cylinder including upper and lower auxiliary chambers separated by an auxiliary piston head, a first connection conduit connecting the upper primary chamber and the upper auxiliary chamber, a second connection conduit connecting the lower primary chamber and the lower auxiliary chamber, and a cylinder valve arrangement configured to regulate fluid flow to the auxiliary pressure cylinder.

16 Claims, 1 Drawing Sheet

(51) Int. Cl.
*B60G 13/08* (2006.01)
*F16F 9/44* (2006.01)
*F16F 9/50* (2006.01)

(52) U.S. Cl.
CPC ...... *B60G 2202/21* (2013.01); *B60G 2202/24* (2013.01); *B60G 2204/8304* (2013.01); *B60G 2206/41* (2013.01); *B60G 2300/024* (2013.01); *B60G 2400/60* (2013.01); *B60G 2500/10* (2013.01); *B60G 2500/102* (2013.01); *B60G 2800/16* (2013.01); *F16F 9/50* (2013.01)

(58) Field of Classification Search
USPC .......................... 280/124.106, 104; 267/186
See application file for complete search history.

(56) References Cited

U.S. PATENT DOCUMENTS

| | | | |
|---|---|---|---|
| 7,390,001 B2 | 6/2008 | Mizuno | |
| 7,909,341 B2 * | 3/2011 | Van Der Knaap ... | B60G 17/033 |
| | | | 280/124.106 |
| 2008/0272561 A1 | 11/2008 | Monk et al. | |
| 2015/0354658 A1 * | 12/2015 | Marking ................. | F16F 9/46 |
| | | | 188/313 |

OTHER PUBLICATIONS

Written Opinion of the International Searching Authority published Jul. 2, 2015 for PCT/IL2014/051117.
International Preliminary Report on Patentability completed Mar. 9, 2016 for PCT/IL2014/051117.

\* cited by examiner

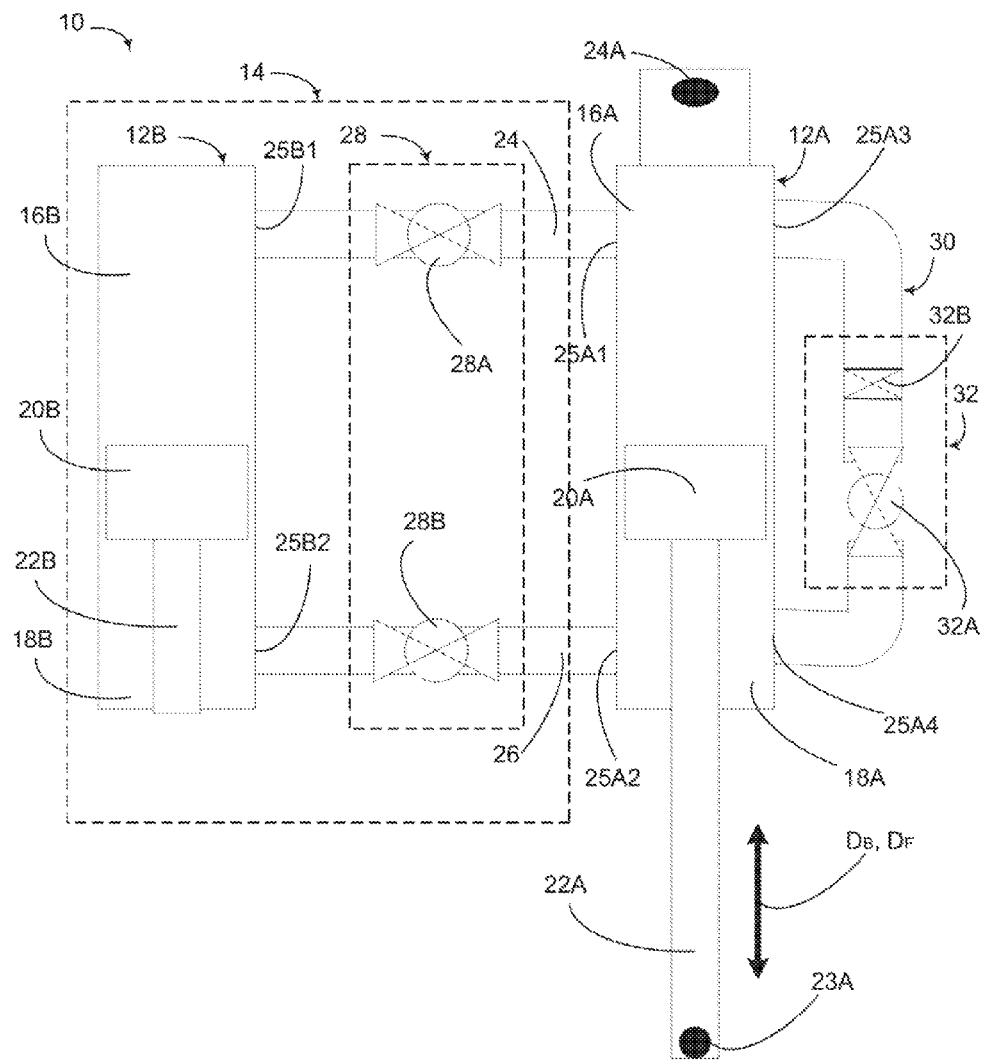

VEHICLE SHOCK ABSORBER SYSTEM AND ACCESSORY THEREOF

FIELD OF THE INVENTION

The subject matter of the present application relates to a shock absorber system and components thereof, and, more particularly, to a system configured with more than one damping resistance value.

BACKGROUND OF THE INVENTION

Vehicle shock absorber systems are configured to provide a damping effect within a predetermined value range. The range is selected in accordance with an expected load on the system, such as, a heavy load or a light load.

For example, a system can be configured for a vehicle, or portion of a vehicle, which typically carries a relatively heavy load to provide suitable shock absorption within a predetermined value range suitable for carrying heavy loads. However, that system may provide poor performance, at least comfort-wise to a passenger of the vehicle, when the vehicle, or portion thereof, is free of heavy loads, especially when travelling on a high quality or smooth road.

Conversely, a system can be configured for a vehicle, or portion of a vehicle, which typically carries a relatively light load to provide suitable shock absorption within a predetermined value range suitable for normal usage of carrying light loads. However, that system may provide poor performance, at least comfort-wise to the passenger of the vehicle, when the vehicle, or portion thereof, is carrying an unusual, relatively heavy load or is travelling on a low-quality or bumpy road, or off-road.

Furthermore, the spring and shock of typical vehicle shock absorber systems have to be in tune with each other. Therefore, simply changing the spring rate, without tuning the shock accordingly, does not provide an adequate solution to the problem described above.

SUMMARY OF THE INVENTION

It has been found that a vehicle shock absorber system configured with more than one pressure cylinder can provide advantageous damping characteristics for different loads.

In accordance with a first aspect of the subject matter of the present application, there is provided a vehicle shock absorber system having a primary pressure cylinder including upper and lower primary chambers separated by a primary piston head, an auxiliary pressure cylinder including upper and lower auxiliary chambers separated by an auxiliary piston head, a first connection conduit connecting the upper primary chamber and the upper auxiliary chamber, a second connection conduit connecting the lower primary chamber and the lower auxiliary chamber, and a cylinder valve arrangement configured to regulate fluid flow to the auxiliary pressure cylinder.

In accordance with a further aspect of the subject matter of the present application, there is provided a vehicle shock absorber system accessory having an auxiliary pressure cylinder. The auxiliary pressure cylinder includes an auxiliary piston head configured to remain in a single position within the auxiliary pressure cylinder and to separate the auxiliary pressure cylinder into upper and lower auxiliary chambers, an upper auxiliary chamber inlet in fluid communication with the upper auxiliary chamber, and a lower auxiliary chamber inlet in fluid communication with the lower auxiliary chamber.

It will be understood that the upper and lower auxiliary chamber inlets are configured for connection to, i.e., for use with, a primary pressure cylinder of a vehicle shock absorber system.

It will also be understood that the above-said is a summary, and that any of the aspects or embodiments mentioned above may further include any of the features described in connection with any of the other aspects or embodiments described herein below. Specifically, the following features, either alone or in combination, may be applicable to any of the above aspects or embodiments:

A. A vehicle shock absorber system or accessory that includes a first connection conduit connected to an upper auxiliary chamber and a second connection conduit connected to a lower auxiliary chamber. More precisely, the first connection conduit can be connected to an upper auxiliary chamber inlet and the second connection conduit can be connected to a lower auxiliary chamber inlet.

B. An auxiliary piston head that is configured to remain in a single position within an auxiliary pressure cylinder, and to separate the auxiliary pressure cylinder into upper and lower auxiliary chambers. Stated differently, the upper and lower auxiliary chambers can have predetermined volumes.

C. A vehicle shock absorber system or accessory that includes a cylinder valve arrangement. The cylinder valve arrangement can include a first valve located in a first connection conduit and/or a second valve located in a second connection conduit.

D. A vehicle shock absorber system that includes a bypass conduit connecting upper and lower primary chambers.

E. A vehicle shock absorber system that includes a bypass valve arrangement configured to regulate fluid flow through a bypass conduit.

F. A bypass valve arrangement that includes at least one valve located in a bypass conduit. The at least one valve can be a first bypass valve. The bypass valve arrangement can further include a needle valve.

G. One or more, or all, of the valves of the system can be configured to be manually operated.

H. One or more, or all, of the valves of the system can be configured to be automatically operated.

I. One or more, or all, of the valves of the system can be configured to bring the system to three operative states, namely—a first operative state where only the primary pressure cylinder is operative, a second operative state where only the primary pressure cylinder and the auxiliary pressure cylinder are operative, and a third operative state where only the primary pressure cylinder and bypass conduit are operative.

J. A primary pressure cylinder that is configured with a predetermined primary damping resistance value ($R_1$).

K. An auxiliary pressure cylinder that is configured with a predetermined auxiliary damping resistance value ($R_2$).

L. A bypass conduit that is configured with a predetermined bypass resistance value ($R_3$). More precisely, a bypass valve arrangement of the bypass conduit can be configured with the predetermined bypass resistance value ($R_3$). The predetermined bypass resistance value ($R_3$) can have no resistance (i.e.: $R_3=0$) when the bypass conduit is in an open state (e.g., when all valves thereof are open). In an embodiment where the bypass conduit further includes, for example, a needle valve, the predetermined bypass resistance value ($R_3$) can be configured to a zero value or another value.

BRIEF DESCRIPTION OF THE DRAWINGS

For a better understanding of the subject matter of the present application, and to show how the same may be carried out in practice, reference will now be made to the accompanying drawing, in which:

FIG. 1 is a schematic view of a vehicle shock absorber system including a vehicle shock absorber system accessory.

DETAILED DESCRIPTION

Referring to FIG. 1, there is illustrated a vehicle shock absorber system 10.

The system 10 includes a primary pressure cylinder 12A and a vehicle shock absorber system accessory 14.

Primary pressure cylinder 12A includes an upper primary chamber 16A, a lower primary chamber 18A, and a primary piston head 20A separating upper primary chamber 16A and lower primary chamber 18A. Piston head 20A can include a piston head valve (not shown). The piston head valve can have a fixed cross section or a pressure sensitive cross section that provides pressure or speed dependant damping, sensitive to the speed of the load, e.g., opens more under heavy pressure. The piston head valve can include shims that bend under a load.

Primary piston head 20A can be configured for movement within primary pressure cylinder 12A, which in turn causes movement of a fluid therein (not shown). The movement of primary piston head 20A within the fluid of primary pressure cylinder 12A can provide a damping effect on the shock absorption of a vehicle (not shown) to which system 10 is connected. More precisely, primary pressure cylinder 12A can be configured with a predetermined primary damping resistance value $R_1$.

More specifically, primary piston head 20A can be connected to a primary piston rod 22A, which in turn is connected to the vehicle. For example, an eyelet 23A of primary piston rod 22A can be connected to the vehicle's wheel axle support (not shown). Similarly, a primary cylinder connector 24A, located at an opposing side of primary pressure cylinder 20A from primary piston rod 22A, i.e., adjacent to upper primary chamber 16A in this non-limiting example, can be connected to a different portion of the vehicle, such as, its chassis.

During operation of the vehicle, primary piston rod 22A can move vertically in two opposite directions: a first "backward" direction $D_B$ (away from the ground), and a second "forward" direction $D_F$ (towards the ground) ("backward" and "forward" being relative to the direction of primary piston rod 22A towards the ground), in a manner known to pressure cylinders.

Primary pressure cylinder 12A includes a first upper primary chamber inlet 25A1 in fluid communication with upper primary chamber 16A, and a first lower primary chamber inlet 25A2 in fluid communication with lower primary chamber 18A. First upper primary chamber inlet 25A1 and first lower primary chamber inlet 25A2 are used to connect primary pressure cylinder 12A to accessory 14, or, more precisely, to a first connection conduit 24 and a second connection conduit 26 thereof.

Primary pressure cylinder 12A can further include a second upper primary chamber inlet 25A3 in fluid communication with upper primary chamber 16A, and a second lower primary chamber inlet 25A4 in fluid communication with lower primary chamber 18A. Second upper primary chamber inlet 25A3 and second lower primary chamber inlet 25A4 are used to connect primary pressure cylinder 12A to a bypass conduit 30.

System 10 further includes an auxiliary pressure cylinder 12B. Auxiliary pressure cylinder 12B includes an upper auxiliary chamber 16B, a lower auxiliary chamber 18B, and an auxiliary piston head 20B separating upper auxiliary chamber 16B and lower auxiliary chamber 18B. Auxiliary piston head 20B can include a piston head valve (not shown), as described above.

Auxiliary pressure cylinder 12B can be configured with a predetermined auxiliary damping resistance value $R_2$.

In contrast with primary pressure cylinder 12A, auxiliary piston head 20B can be configured to remain in a single, stationary position within auxiliary pressure cylinder 12B. In such a case it will be understood that upper and lower auxiliary chambers 16B, 18B each have a fixed volume.

Auxiliary pressure cylinder 12B includes an upper auxiliary chamber inlet 25B1 in fluid communication with upper auxiliary chamber 16B, and a lower auxiliary chamber inlet 25B2 in fluid communication with lower auxiliary chamber 18B. Upper auxiliary chamber inlet 25B1 and lower auxiliary chamber inlet 25B2 are used to connect auxiliary pressure cylinder 12B to primary pressure cylinder 12A.

First connection conduit 24 can connect upper primary chamber 16A and upper auxiliary chamber 16B. More precisely, first connection conduit 24 can connect first upper primary chamber inlet 25A1 and upper auxiliary chamber inlet 25B1. To elaborate, first connection conduit 24 can be in fluid communication with both upper primary chamber 16A and upper auxiliary chamber 16B.

Second connection conduit 26 can connect lower primary chamber 18A and lower auxiliary chamber 18B. More precisely, second connection conduit 26 can connect first lower primary chamber inlet 25A2 and lower auxiliary chamber inlet 25B2. To elaborate, second connection conduit 26 can be in fluid communication with both lower primary chamber 18A and lower auxiliary chamber 18B.

Accessory 14 can include a cylinder valve arrangement 28 configured to regulate fluid flow to auxiliary pressure cylinder 12B. Cylinder valve arrangement 28 includes a first valve 28A located in first connection conduit 24 and a second valve 28B located in second connection conduit 26.

First and second valves 28A, 28B can be configured to be brought to open or closed operative states, which respectively permit or prevent fluid passage through first and second connection conduits 24, 26.

As mentioned above, system 10 includes a bypass conduit 30. Bypass conduit 30 connects upper primary chamber 16A and lower primary chamber 18A. More precisely, bypass conduit 30 connects second upper primary chamber inlet 25A3 and second lower primary chamber inlet 25A4. Bypass conduit 30 is in fluid communication with upper primary chamber 16A and lower primary chamber 18A.

Bypass conduit 30 can further include a bypass valve arrangement 32 configured to regulate fluid flow through bypass conduit 30.

Bypass valve arrangement 32 includes a first bypass valve 32A configured to permit or prevent fluid passage through bypass conduit 30.

Bypass valve arrangement 32 can be configured with a damping resistance value $R_3$. For example, when bypass valve 32A is open, the damping resistance value $R_3$ can be zero.

Optionally, bypass valve arrangement 32 can further include an additional valve, such as, a needle valve 32B configured to provide a desired resistance.

The vehicle shock absorber system 10 can have three different operative modes.

In a first operative mode, in which cylinder valve arrangement 28 is in a closed state, i.e., first valve 28A and second valve 28B are closed, and bypass valve arrangement 32 is in a closed state, i.e., first bypass valve 32A is closed, the damping effect provided by system 10 on the vehicle is equal to the primary damping resistance value $R_1$ of primary pressure cylinder 12A.

In a second operative mode of system 10, in which cylinder valve arrangement 28 is in an open state, i.e., first valve 28A and second valve 28B are open, and bypass valve arrangement 32 is in a closed state, the damping effect provided by system 10 on the vehicle is equal to an inverse of the sum of the inverse resistance values (for system resistance R, $1/R = 1/R_1 + 1/R_2$). In a non-limiting example, if both the primary and auxiliary damping resistance values ($R_1$, $R_2$) are of equal magnitude, the resistance of system 10 is halved.

It will be appreciated that the first operative mode may be preferred, for example, for a vehicle carrying a relatively heavy load, and that the second operative mode may be preferred for that vehicle when it is carrying a relatively lighter load.

Cylinder valve arrangement 28 can be configured to be switched manually between the first and second operative modes, and/or can be configured to be switched automatically between those two modes. For example, a vehicle computer system (not shown) may be configured to detect the load carried by the vehicle or on vehicle shock absorber system 10, and may automatically switch cylinder valve arrangement 28 to a desired mode. The automatic switching can also be operated dynamically, i.e., according to a change in road conditions when the vehicle is in motion. Additionally or alternatively, system 10 can further include a manual switch (not shown) which is configured to change the operative mode. The switch can be located in a driver's compartment (not shown) of the vehicle. It will be understood that in addition to the manual and automatic options mentioned above, cylinder valve arrangement 28 may also be configured to allow direct manual adjustment of valves 28A, 28B themselves at their respective locations.

In a third operative mode of system 10, when bypass valve arrangement 32 is in an open state, i.e., first bypass valve 32A is open (and assuming bypass conduit 30 is devoid of optional needle valve 32B), the damping effect provided by system 10 is effectively zero as the fluid can merely pass through bypass conduit 30 without resistance. Bypass valve arrangement 32 can be switched to, and from, its open state from, and to, either the first or second operative mode.

Also, it will be understood that bypass valve arrangement 32 can be brought to open or closed operative modes in any of the manners described above in connection with the cylinder valve arrangement 28 (manual, automatic, remote, proximate, etc.). Similarly, needle valve 32B may be similarly adjustable in such manner.

The device of the present invention can be used in tandem with the primary shock (not shown) of a vehicle. The different levels of dampening, e.g., zero, ½R and 1R is added to the dampening value of the primary shock Z, for a total dampening value (according to this example) of: Z, Z+½R, or Z+R, depending on the mode of operation. In a non-limiting example, Z is configured to support a vehicle weight of 2.5 tons and R is configured to support an added weight of 2 tons. Support for an unloaded, empty vehicle of 2.5 tons would be provided by the mode where the bypass is open and only the primary shock is working (R=0, a total dampening value of Z). Support for the same vehicle with an added load of 1 ton (half the added weight that R is configured for), i.e., a total weight of 3.5 tons (the vehicle plus the added weight), would be provided by the mode where the bypass is closed and the connection to the secondary valve is open (a total dampening value of Z+½R). Support for the vehicle with a full load of 2 tons, i.e., a total weight of 4.5 tons, would be provided by the mode where the bypass is closed and the connection to the secondary valve is closed (a total dampening value of Z+R). In this way, the device of the present invention makes it possible to tune the shock in accordance with a change in spring rate of the vehicle on the fly and still have good working suspension.

The description above includes an exemplary embodiment and details, and does not exclude non-exemplified embodiments and details from the claim scope of the present application. While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

What is claimed is:

1. A vehicle shock absorber system mounted between a wheel axle support of the vehicle and a different portion of the vehicle, comprising:
   a primary pressure cylinder comprising upper and lower primary chambers separated by a primary piston head, wherein said primary piston head is connected to said wheel axle support of the vehicle, and said primary pressure cylinder is connected to said different portion of the vehicle;
   an auxiliary pressure cylinder comprising upper and lower auxiliary chambers separated by an auxiliary piston head;
   a first connection conduit connecting said upper primary chamber and said upper auxiliary chamber;
   a second connection conduit connecting said lower primary chamber and said lower auxiliary chamber;
   a cylinder valve arrangement configured to regulate fluid flow to said auxiliary pressure cylinder; and
   at least one valve, the at least one valve selected from the group consisting of:
      a first valve of said cylinder valve arrangement, wherein the first valve is located in said first connection conduit;
      a second valve of said cylinder valve arrangement, wherein the second valve is located in said second connection conduit; and
      a bypass valve of a bypass valve arrangement of a bypass conduit connecting said upper and lower primary chambers, wherein the bypass valve arrangement is configured to regulate fluid flow through said bypass conduit, wherein said at least one bypass valve is located in said bypass conduit,
   wherein the at least one valve is configured to bring the system to three operative states, namely a first operative state where only said primary pressure cylinder is operative, a second operative state where said primary pressure cylinder and said auxiliary pressure cylinder are operative, and a third operative state where said bypass conduit connecting said upper and lower primary chambers is operative.

2. The vehicle shock absorber system according to claim 1, wherein said at least one valve is the first valve located in said first connection conduit and/or the second valve located in said second connection conduit.

3. The vehicle shock absorber system according to claim 1, wherein said at least one valve is the bypass valve located in said bypass conduit.

4. The vehicle shock absorber system according to claim 3, wherein said bypass valve comprises a needle valve.

5. The vehicle shock absorber system according to claim 1, wherein the at least one valve is configured to be automatically operated.

6. The vehicle shock absorber system according to claim wherein said bypass conduit is configured with a predetermined bypass resistance value ($R_3$) of zero when in an open state, said primary pressure cylinder is configured with a predetermined primary damping resistance value ($R_1$), and said auxiliary pressure cylinder is configured with a predetermined auxiliary damping resistance value ($R_2$).

7. The vehicle shock absorber system according to claim 1, wherein said auxiliary piston head is configured to remain in a single position within an auxiliary pressure cylinder when not operative and to separate said auxiliary pressure cylinder into upper and lower auxiliary chambers.

8. The vehicle shock absorber system according to claim 1, wherein said different portion of the vehicle comprises the vehicle's chassis.

9. The vehicle shock absorber system according to claim wherein the at least one valve is the bypass valve and wherein the bypass valve includes at least one needle valve.

10. The vehicle shock absorber system according to claim 1, wherein the at least one valve is configured to be manually operated.

11. A vehicle shock absorber system accessory, for coupling with a primary shock absorber having upper and lower primary chambers and mounted between a wheel axle support of the vehicle and a different portion of the vehicle, comprising an auxiliary pressure cylinder;

the auxiliary pressure cylinder comprising:
an auxiliary pressure cylinder with upper and lower auxiliary chambers separated by an auxiliary piston head;
an upper auxiliary chamber inlet in fluid communication with said upper auxiliary chamber and said upper primary chamber by a first connection conduit;
a lower auxiliary chamber inlet in fluid communication with said lower auxiliary chamber and said lower auxiliary chamber inlet by a second connection conduit; and
a cylinder valve arrangement configured to regulate fluid flow to said auxiliary pressure cylinder,
wherein said cylinder valve arrangement comprises at least one of a first valve located in said first connection conduit and a second valve located in said second connection conduit,
a bypass valve of a bypass valve arrangement of a bypass conduit connecting said upper and lower primary chambers, wherein the bypass valve arrangement is configured to regulate fluid flow through said bypass conduit, wherein said at least one bypass valve is located in said bypass conduit,
wherein the at least one of: said first valve, said second, and said bypass valve, is configured to bring the primary shock absorber and the system accessory to three operative states, namely a first operative state where only said primary shock absorber is operative, a second operative state where said primary shock absorber and said auxiliary pressure cylinder are operative, and a third operative state where said bypass conduit connecting said upper and lower primary chambers is operative.

12. The vehicle shock absorber system accessory according to claim 11, wherein said different portion of the vehicle comprises the vehicle's chassis.

13. The vehicle shock absorber system accessory according to claim 11, wherein the at least one of the first and second valves are configured to be manually operated.

14. The vehicle shock absorber system accessory according to claim 11, wherein the at least one of the first and second valves are configured to be automatically operated.

15. The vehicle shock absorber system accessory according to claim 11, wherein said bypass conduit is configured with a predetermined bypass resistance value ($R_3$) of zero when in an open state, said primary shock absorber is configured with a predetermined primary damping resistance value ($R_1$), and said auxiliary pressure cylinder is configured with a predetermined auxiliary damping resistance value ($R_2$).

16. The vehicle shock absorber system accessory according to claim 11, wherein said auxiliary piston head is configured to remain in a single position within the auxiliary pressure cylinder when not operative and to separate said auxiliary pressure cylinder into said upper and lower auxiliary chambers.

* * * * *